US011005725B2

(12) United States Patent
Siddappa (10) Patent No.: US 11,005,725 B2
(45) Date of Patent: May 11, 2021

(54) METHODS AND APPARATUS TO PROACTIVELY SELF-HEAL WORKLOAD DOMAINS IN HYPERCONVERGED INFRASTRUCTURES

(71) Applicant: VMWARE, INC., Palo Alto, CA (US)

(72) Inventor: Gireesha Udagani Siddappa, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 156 days.

(21) Appl. No.: 16/125,808

(22) Filed: Sep. 10, 2018

(65) Prior Publication Data
US 2020/0007408 A1    Jan. 2, 2020

(30) Foreign Application Priority Data

Jun. 29, 2018  (IN) .............................. 201841024252

(51) Int. Cl.
*G06F 15/173*  (2006.01)
*H04L 12/24*  (2006.01)

(52) U.S. Cl.
CPC ........ *H04L 41/147* (2013.01); *H04L 41/0659* (2013.01)

(58) Field of Classification Search
None
See application file for complete search history.

(56) References Cited

U.S. PATENT DOCUMENTS

| | | | |
|---|---|---|---|
| 10,142,208 B1 * | 11/2018 | Mace | H04L 47/781 |
| 2008/0183855 A1 * | 7/2008 | Agarwal | H04L 41/5035 |
| | | | 709/223 |
| 2010/0238814 A1 * | 9/2010 | Chen | H04L 41/147 |
| | | | 370/252 |
| 2011/0191477 A1 | 8/2011 | Zhang | |
| 2016/0359683 A1 * | 12/2016 | Bartfai-Walcott | ............ |
| | | | H04L 41/5009 |
| 2016/0371127 A1 | 12/2016 | Antony et al. | |
| 2017/0003951 A1 | 1/2017 | Newell et al. | |
| 2017/0149931 A1 * | 5/2017 | Lochhead | H04L 41/0896 |
| 2017/0286148 A1 | 10/2017 | Zou | |
| 2018/0081913 A1 * | 3/2018 | Suleiman | G06F 16/215 |
| 2018/0081914 A1 * | 3/2018 | Zoll | H04L 41/142 |
| 2018/0267833 A1 | 9/2018 | Chen et al. | |
| 2018/0367412 A1 * | 12/2018 | Sethi | H04L 41/0853 |
| 2019/0235922 A1 | 8/2019 | Iovanna et al. | |
| 2019/0266534 A1 | 8/2019 | Kessaci | |
| 2019/0324820 A1 | 10/2019 | Krishnan et al. | |
| 2019/0332473 A1 * | 10/2019 | Yang | H03M 13/356 |
| 2020/0026446 A1 * | 1/2020 | Jawahar | G06F 3/065 |

OTHER PUBLICATIONS

Salfner, "Predicting Failures with Hidden Markov Models," ResearchGate, Jun. 4, 2014, 7 pages.

* cited by examiner

*Primary Examiner* — Phyllis A Book
(74) *Attorney, Agent, or Firm* — Hanley, Flight & Zimmerman, LLC (57) ABSTRACT

Example methods, apparatus and articles of manufacture to proactively self-heal workload domains in hyperconverged infrastructures are disclosed herein. A disclosed example apparatus includes a fault predictor to determine a probability that a node of a workload domain in a hyperconverged infrastructure will likely become faulty, and a decommissioner to decommission the node from the workload domain after the probability indicates the node will likely become faulty.

26 Claims, 6 Drawing Sheets

METHODS AND APPARATUS TO PROACTIVELY SELF-HEAL WORKLOAD DOMAINS IN HYPERCONVERGED INFRASTRUCTURES

RELATED APPLICATIONS

Benefit is claimed under 35 U.S.C. 119(a)-(d) to Foreign Application Serial No. 201841024252 filed in India entitled "METHODS AND APPARATUS TO PROACTIVELY SELF-HEAL WORKLOAD DOMAINS IN HYPERCONVERGED INFRASTRUCTURES", on Jun. 29, 2018, by VMware, Inc., which is herein incorporated in its entirety by reference for all purposes.

FIELD OF THE DISCLOSURE

The present disclosure relates generally to workload domains in hyperconverged infrastructures and, more particularly, to methods and apparatus to self-heal workload domains in hyperconverged infrastructures.

BACKGROUND

VMware® Cloud Foundation™ (VCF) is an integrated cloud infrastructure platform for a hybrid cloud that includes both private and public environments. VCF provides dynamic software-defined infrastructure (compute, storage, networking and security) to run enterprise applications in both the private and public environments. VCF enables software-defined data center (SDDC™) private clouds to be easily built and run on integrated systems. Based on an elastic, highly scalable, and distributed hyperconverged infrastructure architecture, compute, storage, and networking resources can be delivered using a hypervisor running on industry-standard, prequalified hardware offered by select partners. VCF is ideal for enterprises and service providers focused on greater simplicity, faster time-to-value, enhanced security, and lower total cost of ownership. VMware's hyperconverged infrastructure (VCF) introduces the use of workload domains in hybrid clouds. Workload domains are physically isolated containers that hold (e.g., execute) a group of applications with a substantially similar performance requirement, availability requirement, and/or security requirement executing on one or more nodes (e.g., servers).

BRIEF DESCRIPTION OF THE DRAWINGS

When beneficial, the same reference numbers will be used throughout the drawing(s) and accompanying written description to refer to the same or like parts. Connecting lines or connectors shown in the various figures presented are intended to represent example functional relationships, physical couplings and/or logical couplings between the various elements.

DETAILED DESCRIPTION

Prior VCF systems support servers having field-replaceable units (FRUs). An FRU is, for example, a printed circuit board, part, or assembly that can be quickly and easily removed from a computer or other piece of electronic equipment and replaced by the user or a technician without having to send the entire product or system to a repair facility. However, when a node (e.g., a server) is found dead, degraded, etc., an administrator must manually identify the node and decommission the node before it can be serviced. When the dead or degraded node is part of a workload domain, the administrator has to manually identify the node, manually decommission the node from the workload domain to which the node belongs, manually repair or replace the node, and manually commission a repaired/replaced node to the workload domain (e.g., perform a workload domain expansion). Such processes can result in excessive downtime for the workload domain. For critical workload domains, even a small amount of downtime may be unacceptable. Prior techniques rely on an actual fault being identified to trigger a repair/replacement of the node and the workload domain to which the node belongs. Furthermore, existing systems can only identify a fault condition when an administrator becomes aware that a node has become non-responsive and/or after manual review of critical event logs and/or alert logs. Accordingly, existing systems may result in data loss and/or service loss before the administrator even becomes aware of a faulty node.

Examples disclosed herein predict in advance whether a node is likely to become faulty (e.g., cease operating, become degraded, etc.). Disclosed examples proactively manage the workload domain to which the node belongs by shifting applications off the identified potentially faulty node onto other nodes of the workload domain and decommissioning the identified potentially faulty node from the workload domain. In this manner, examples disclosed herein proactively self-heal the workload domain in that a workload domain manager manages the application offloading without needing intervention of the potentially faulty node. By self-healing the workload domain before a fault occurs at a corresponding node, the workload domain remains in a properly operating state, albeit with less processing capability. As part of the self-healing, a replacement/repaired node is commissioned into the workload domain (e.g., a workload domain expansion), and applications in the workload domain are load balanced to take advantage of the restored processing capabilities of the workload domain. In some examples, the potentially faulty node is automatically decommissioned and the workload domain is automatically rebalanced; and the commissioning of the replacement node is manually triggered and/or initiated by an administrator. In some examples, a replacement node is automatically commissioned from a pool of reserved replacement nodes, and the applications are automatically load balanced. Examples disclosed herein improve availability of workload domains, increase scalability, and allow for workload domain priorities. For example, a failure in a production workload domain could be addressed before a failure in a test workload domain is addressed based on the production workload domain having a higher priority than the test workload domain.

Reference will now be made in detail to non-limiting examples of this disclosure, examples of which are illustrated in the accompanying drawings. The examples are disclosed below by referring to the drawings.

Figure 1:
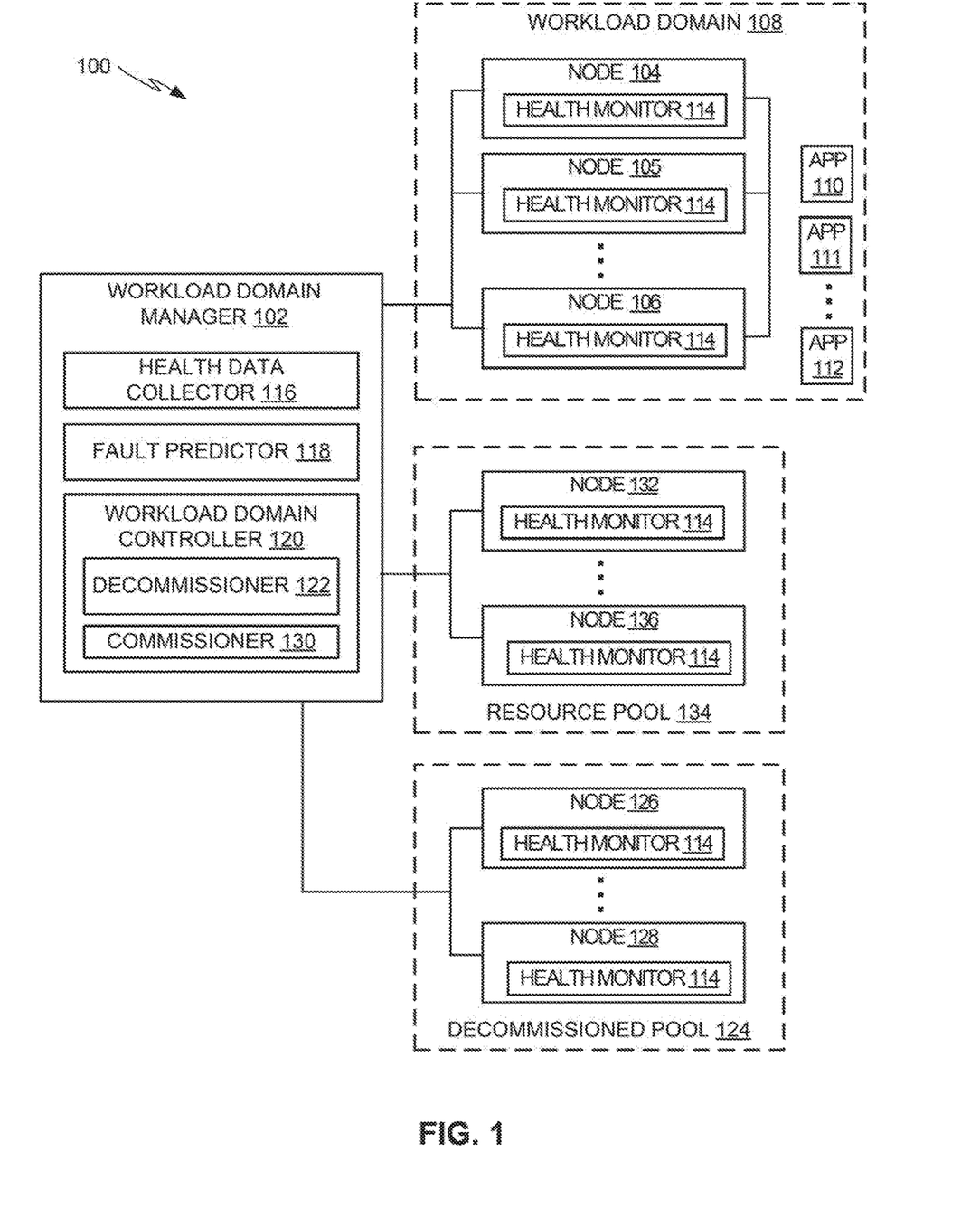
FIG. 1 is an example hyperconverged infrastructure environment in which a workload domain manager in accordance with teachings of this disclosure self-heals workload domains.

FIG. 1 is an example hyperconverged infrastructure environment 100 in which an example workload domain manager 102 automatically predicts the likelihood an example node (three of which are designated at reference numerals 104, 105, and 106) of a workload domain 108 will become faulty (e.g., degraded, etc.), and automatically and proactively self-heals the workload domain 108 by decommissioning the node 104-106 from the workload domain 108 before the node 104-106 becomes degraded. Thus, the workload domain 108 as a whole is prevented from becoming faulty. A plurality of applications 110, 111, 112 having substantially similar performance, availability, security, etc. requirements execute on the nodes 104-106 of the workload domain 108. An application 110-112 may be executed by one or more of the nodes 104-106.

To monitor the health of the nodes 104-106, each of the example nodes 104-106 of FIG. 1 includes an example respective health monitor 114. The example health monitors 114 of FIG. 1 monitor any number and/or type(s) of health indicators and/or events (e.g., central processing unit (CPU) temperature goes above 80-90% of maximum temperature, CPU thermal trip error with excessive CPU temperature, CPU critical failure, etc.). In some examples, for each FRU of a node 104-106, the example health monitor 114 monitors, e.g., the node's CPU, memory, Ethernet controller, storage devices and disks, storage controller(s), basic input/outputs system (BIOS), server board(s), and server board components such as fan, power supply unit (PSU), peripheral component interconnect (PCI) interface(s), baseboard management controller(s) (BMC), etc. In some examples, health data includes sensor states accessed through, e.g., industry standard authentication schemes. In the illustrated example, a health monitor 114 is implemented by, on, for, etc. each node 104-106. Additionally, and/or, alternatively, a health monitor 114 may be implemented for a group of (e.g., for all of) the nodes 104-106. For example, a health monitor 114 for the node 104-106 may be implemented on a rack implementing the nodes 104-106.

To collect health information, the example workload domain manager 102 includes an example health data collector 116. The example health data collector 116 of FIG. 1 obtains (e.g., collects, requests, receives, etc.) health data from the example health monitors 114. In some examples, the example health monitors 114 automatically send health data to the health data collector 116 without polling by the health data collector 116. Additional and/or alternatively, the health data collector 116 polls (e.g., interacts with, accesses an application programming interface (API), requests, etc.) health data from the health monitors 114 for the health data.

To predict when a node 104-106 may become unresponsive, degraded, faulty, etc., the example workload domain manager 102 includes an example fault predictor 118. In some examples, the example fault predictor 118 uses health data collected by the example health data collector 116 for a node (e.g., the node 104) and data regarding past events, failures, degradations, etc. of other nodes to determine the likelihood (e.g., a probability) that the node 104 will, e.g., wholly or partially fail. In some examples, a hidden Markov model is used to extrapolate future behavior and determine the likelihood (e.g., probability) of failure based on previously collected health data from one or more workload domains. However, other methods of determining a probability of failure may be used.

A hidden Markov model is an extension of a finite discrete time Markov chain. Discrete time Markov chains are defined by a set of labeled states $S=\{S_i\}$ ($1 \leq i \leq N$), a square stochastic matrix $A=[a_{ij}]$ defining transition probabilities between any pair of states, and a vector $\pi=[\pi_i]$ specifying an initial probability for each state. Hidden Markov models extend discrete time Markov chains in that an output is produced each time the discrete time Markov chain enters a state. More formally, the outputs are called observation symbols from a finite set $O=\{O_k\}$ ($1 \leq k \leq M$). The set of observation symbols is sometimes called the alphabet of the hidden Markov model. Each state $S_i$ can output any symbol $O_k$ based on the observation probability distribution $b_i(k)$. The output matrix $B=[b_i(k)]$ is a rectangular N×M stochastic matrix. Hidden Markov models are "hidden" in the sense that they are usually used in scenarios where only the sequence of observations is known, but not the sequence of states the model has gone through.

A hidden Markov model can be trained using a set of given observation sequences called training sequences. The goal of training is to find hidden Markov model parameters (transition matrix A, symbol production matrix B and initial state vector $\pi$) that best fit the training data. In some examples, gradient or expectation-maximization techniques such as the Baum-Welch algorithm that iteratively improve an initialized model are used to train the hidden Markov model parameters. The goal of training is to adjust the Markov model parameters such that the error patterns are best represented by the model and that the model transits to a failure state each time a failure actually occurs in the training data. In the examples disclosed herein, observation training sequences for the hidden Markov model of the fault predictor 118 include past (e.g., historical) health data collected from the nodes 204-206 (and possibly other nodes), together with information regarding when actual faults occurred. In use, current health data collected from the nodes 204-206 is passed through the trained hidden Markov model. The hidden Markov model predicts faults (e.g., possible failures with associated probabilities of occurrence) based on current health data. The possible faults are predicted faults in that they have not actually occurred yet.

To control workload domains, the example workload domain manager 102 of FIG. 1 includes an example workload domain controller 120. When the example fault predictor 118 predicts that a node (e.g., the node 104) is likely to be faulty (e.g., wholly or partially) an administrator is warned of the potential fault (e.g., a potential failure), and an example decommissioner 122 of the workload domain controller 120 automatically decommissions the node from the workload domain (e.g., the workload domain 108) to which the node belongs. In some examples, node is likely to be faulty when a probability of failure exceeds a predetermined failure probability threshold. In contrast when the likelihood is low (e.g., a probability of failure does not exceed a failure probability threshold), the node is not decommissioned. In some examples, the threshold varies from component to component of the node. For example, a lower threshold is used for a storage disk may be lower than one used for a memory component. After the node is decommissioned, the example workload domain controller 120 rebalances the applications running on the remaining nodes of the workload domain. In some examples, the decommissioned node is added to an example pool 124 of decommissioned nodes 126, 128 that need to be replaced, repaired, etc.

After a node (e.g., the node 104) is decommissioned, an example commissioner 130 of the workload domain controller 120 automatically commissions a replacement node (e.g., a node 132) by, for example, performing a workload domain expansion to allocate the replacement node, from a resource pool 134 of available replacement nodes 132, 136 to the workload domain (e.g., the workload domain 108) to which the decommissioned node belonged. In examples disclosed herein, a workload domain is considered to be expanded when it is self-healed to include one or more replacement nodes. The workload domain expansion also involves the example workload domain controller 120 rebalancing the applications to run on the nodes including the replacement node of the expanded workload domain.

While an example manner of implementing the example hyperconverged infrastructure environment 100 and the example workload domain 102 is illustrated in FIG. 1, one or more of the elements, processes and/or devices illustrated in FIG. 1 may be combined, divided, re-arranged, omitted, eliminated and/or implemented in any other way. Further, the example health monitors 114, the example health data collector 116, the example fault predictor 118, the example workload domain controller 120, the example decommissioner 122, the example commissioner 130 and/or, more generally, the example workload domain manager 102 and the example environment 100 of FIG. 1 may be implemented by hardware, software, firmware and/or any combination of hardware, software and/or firmware. Thus, for example, any of the example health monitors 114, the example health data collector 116, the example fault predictor 118, the example workload domain controller 120, the example decommissioner 122, the example commissioner 130 and/or, more generally, the example workload domain manager 102 and the example environment 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the health monitors 114, the health data collector 116, the fault predictor 118, the workload domain controller 120, the decommissioner 122, the commissioner 130 and/or, more generally, the workload domain manager 102 and the environment 100 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example workload domain manager 102 and the example environment 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Other example implementations of the example hyperconverged infrastructure environment 100, the example workload domain manager 102, and the example health monitors 114 of FIG. 1 will now be disclosed in detail relative to non-limiting examples of cloud computing, and SDDCs, examples of which are illustrated in the accompanying drawings.

Cloud computing is based on the deployment of many physical resources across a network, virtualizing the physical resources into virtual resources, and provisioning the virtual resources in SDDCs for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on a hyperconverged infrastructure. In examples disclosed herein, hyperconvergence infrastructure combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environment are: full virtualization, paravirtualization, and operating system (OS) virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMware ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMware ESX® hypervisor, Microsoft HYPER-V hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Prior converged and hyper-converged systems enable deploying and operating private clouds by offering an integrated system. However, most of such prior products lack a single governing entity that has visibility into and end-to-end control over an entire (virtual and physical) infrastructure. The lack of a single governing entity makes it difficult to correlate related events such as relating physical switch congestion to a particular traffic source in a VM in a virtual environment, or taking preemptive traffic management action (e.g., a scheduled VM migration event could be used to proactively select an end-to-end network path that does not impact the software-defined data storage traffic), or reflecting network I/O control (NIOC) (e.g., VMware ESX NIOC) configurations at the switch level for end-to-end Quality of Storage (QoS) control during traffic events like software-defined data storage rebalancing. Examples disclosed herein overcome limitations of prior systems by enabling observing and controlling both virtual and physical infrastructures of self-contained private clouds. Examples disclosed herein collect telematics data from switches, hosts, and hypervisor-based virtual infrastructure and take remedial actions based on telematics analyses and user configured policies.

Figure 2:
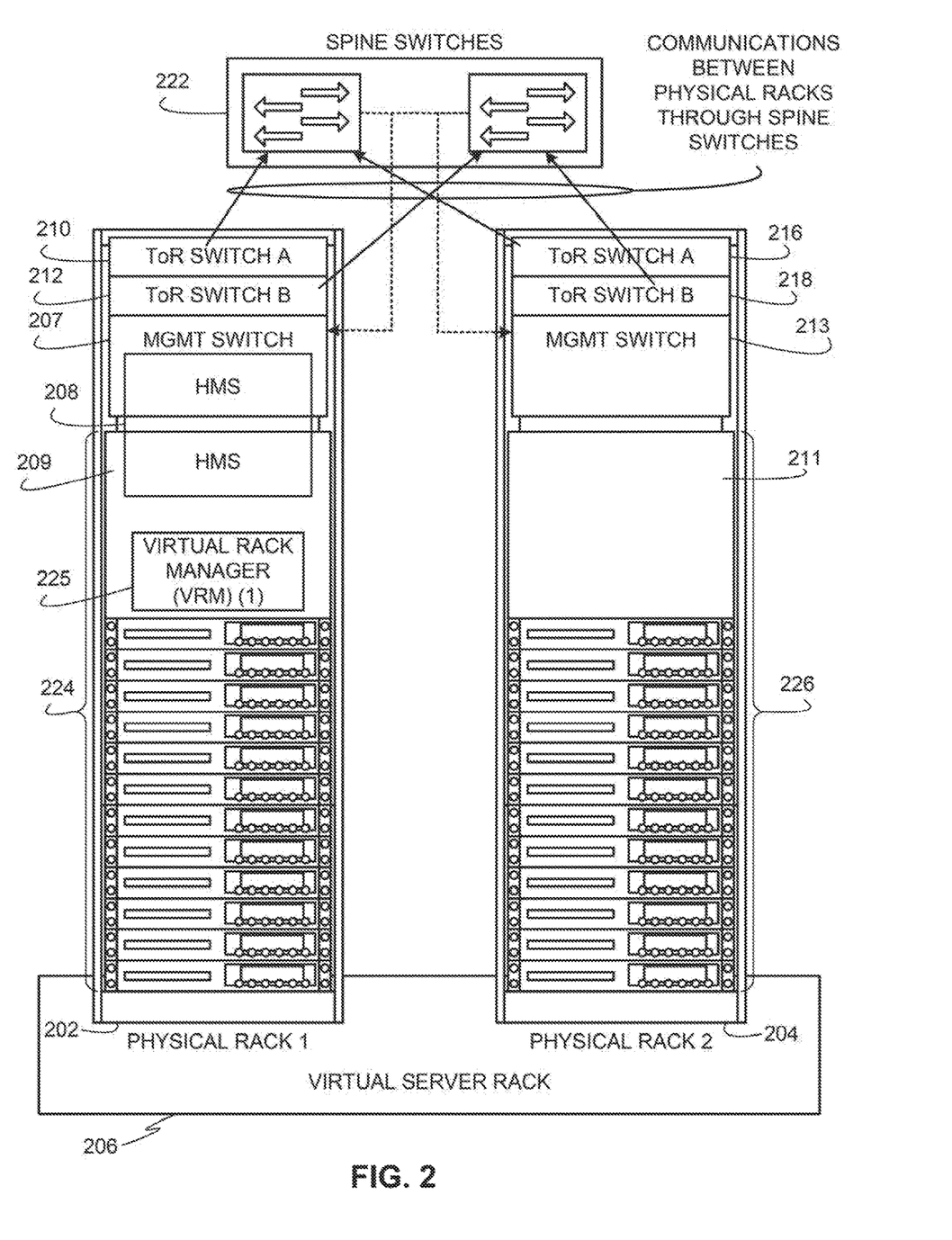
FIG. 2 depicts example physical racks in an example hyperconverged infrastructure that can be used to implement the example environment of FIG. 1.

Examples disclosed herein may be employed with hyperconvergence infrastructure-based SDDCs deployed using virtual server rack systems such as the virtual server rack 206 of FIG. 2. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIG. 2 and FIG. 3, multi-rack deployments can include Top-of-the-Rack (ToR) switches (e.g., leaf switches) and spine switches connected using a Leaf-Spine architecture. A virtual server rack system also includes software-defined data storage (e.g., storage area network (SAN), VMware VIRTUAL SAN™) distributed across multiple hosts for redundancy and virtualized networking software (e.g., VMware NSX™).

A drawback of some virtual server rack systems is that different hardware components located therein can be procured from different equipment vendors, and each equipment vendor can have its own independent OS installed on its hardware. For example, physical hardware resources include white label equipment such as white label servers, white label network switches, white label external storage arrays, and white label disaggregated rack architecture systems (e.g., Intel's Rack Scale Architecture (RSA)). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS™, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration may require additional network bandwidth, which may not be released until the reconfiguration is complete.

Examples disclosed herein provide hyperconvergence infrastructure-based SDDCs with system-level governing features that can actively monitor and manage different hardware and software components of a virtual server rack system even when such different hardware and software components execute different OSs. As described in connection with FIG. 3, major components of a virtual server rack system include a hypervisor, network virtualization software, storage virtualization software (e.g., software-defined data storage), a physical network OS, and external storage. In some examples, the storage virtualization (e.g., VMware VIRTUAL SAN) is integrated with the hypervisor. In examples in which the physical network OS is isolated from the network virtualization software, the physical network is not aware of events occurring in the network virtualization environment and the network virtualization environment is not aware of events occurring in the physical network.

FIG. 2 depicts example physical racks 202, 204 in an example deployment of a virtual server rack 206. The virtual server rack 206 of the illustrated example enables abstracting hardware resources (e.g., physical hardware resources 224, 226). In some examples, the physical hardware resources 224, 226 are used to implement the nodes 104-106 of FIG. 1 to form workload domains 108, and/or pools 124, 134. In some examples, the virtual server rack 206 includes a set of physical units (e.g., one or more racks) with each unit including hardware such as server nodes (e.g., compute+storage+network links), network switches, and, optionally, separate storage units. From a user perspective, the example virtual server rack 206 is an aggregated pool of logic resources exposed as one or more ESXI® clusters along with a logical storage pool and network connectivity. In examples disclosed herein, a cluster is a server group in a virtual environment. For example, an ESXI cluster is a group of physical servers in the physical hardware resources that run ESXI hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 202 has an example ToR switch A 210, an example ToR switch B 212, an example management switch 207, and an example server host node(0) 209. In the illustrated example, the management switch 207 and the server host node (0) 209 run a hardware management system (HMS) 208 for the first physical rack 202. The second physical rack 204 of the illustrated example is also provided with an example ToR switch A 216, an example ToR switch B 218, an example management switch 213, and an example server host node (0) 211. In some examples, the example HMS 208 implements the example health data collectors 116 of FIG. 1.

In the illustrated example, the HMS 208 connects to server management ports of the server host node(0) 209, 211 (e.g., using a baseboard management controller (BMC)), connects to ToR switch management ports (e.g., using 1 gigabits per second (Gbps) links) of the ToR switches 210, 212, 216, 218, and also connects to spine switch management ports of one or more spine switches 222. In the illustrated example, the ToR switches 210, 212, 216, 218, implement leaf switches such that the ToR switches 210, 212, 216, 218, and the spine switches 222 are in communication with one another in a leaf-spine switch configuration. These example connections form a non-routable private Internet protocol (IP) management network for out-of-band (OOB) management. The HMS 208 of the illustrated example uses this OOB management interface to the server management ports of the server host node(0) 209, 211 for server hardware management. In addition, the HMS 208 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) 222 (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208 is provided with in-band (IB) connectivity to individual server nodes (e.g., server nodes in example physical hardware resources 224, 226) of the physical rack 202, 204. In the illustrated example, the IB connection interfaces to physical hardware resources 224, 226 via an OS running on the server nodes using an OS-specific API such as VMware vSphere® API, command line interface (CLI), and/or interfaces such as Common Information Model from Distributed Management Task Force (DMTF).

Example OOB operations performed by the HMS 208 include discovery of new hardware, bootstrapping, remote power control, authentication, hard resetting of non-responsive hosts, monitoring catastrophic hardware failures, and firmware upgrades. The example HMS 208 uses IB management to periodically monitor status and health of the physical resources 224, 226 and to keep server objects and switch objects up to date. Example IB operations performed by the HMS 208 include controlling power state, accessing temperature sensors, controlling BIOS, inventory of hardware (e.g., CPUs, memory, disks, etc.), event monitoring, and logging events.

The HMS 208 of the physical rack 202 interfaces with a virtual rack managers (VRM) 225 to instantiate and manage the virtual server rack 206 using physical hardware resources 224, 226 (e.g., processors, NICs, servers, switches, storage devices, peripherals, power supplies, etc.) of the physical racks 202, 204. In the illustrated example, the VRM 225 of the first physical rack 202 runs on a cluster of three server host nodes of the first physical rack 202, one of which is the server host node(0) 209. In some examples, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

The VRM 225 of the first physical rack 202 runs on a cluster of three server host nodes of the first physical rack 202 using a high availability (HA) mode configuration. Using the HA mode in this manner, enables fault tolerant operation of the VRM 225 in the event that one of the three server host nodes in the cluster for the VRM 225 fails. Upon failure of a server host node executing the VRM 225, the VRM 225 can be restarted to execute on another one of the hosts in the cluster. Therefore, the VRM 225 continues to be available even in the event of a failure of one of the server host nodes in the cluster.

In examples disclosed herein, a CLI and APIs are used to manage the ToR switches 210, 212, 216, 218. For example, the HMS 208 uses CLI/APIs to populate switch objects corresponding to the ToR switches 210, 212, 216, 218. On HMS boot up, the HMS 208 populates initial switch objects with statically available information. In addition, the HMS 208 uses a periodic polling mechanism as part of an HMS switch management application thread to collect statistical and health data from the ToR switches 210, 212, 216, 218 (e.g., Link states, Packet Stats, Availability, etc.). There is also a configuration buffer as part of the switch object which stores the configuration information to be applied on the switch.

The HMS 208 of the illustrated example of FIG. 2 is a stateless software agent responsible for managing individual hardware resources in a physical rack 202, 204. Examples of hardware elements that the HMS 208 manages are servers and network switches in the physical rack 202, 204. In the illustrated example, the HMS 208 is implemented using Java on Linux so that an OOB management portion of the HMS 208 runs as a Java application on a white box management switch (e.g., the management switch 207, 213) in the physical rack 202, 204. However, any other programming language and any other OS may be used to implement the HMS 208.

Figure 3:
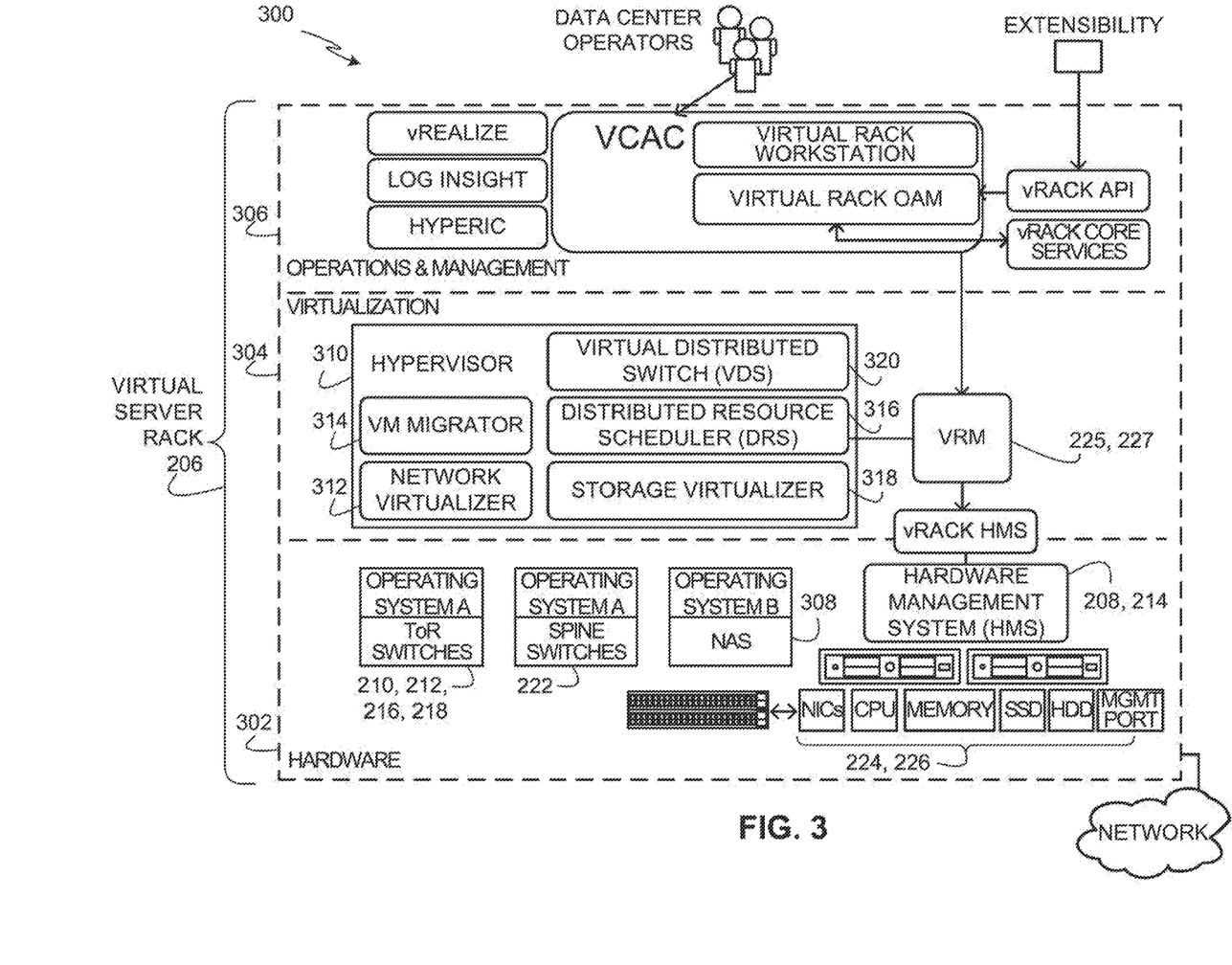
FIG. 3 depicts an example architecture to configure and deploy the example virtual server rack of FIG. 2.

FIG. 3 depicts an example virtual server rack architecture 300 that may be used to configure and deploy the virtual server rack 206 of FIG. 2. The example architecture 300 of FIG. 3 includes a hardware layer 302, a virtualization layer 304, and an operations and management layer (OAM) 306. In the illustrated example, the hardware layer 302, the virtualization layer 304, and the OAM layer 306 are part of the example virtual server rack 206 of FIG. 2. The virtual server rack 206 of the illustrated example is based on the physical racks 202, 204 of FIG. 2. The example virtual server rack 206 configures the physical hardware resources 224, 226, virtualizes the physical hardware resources 224, 226 into virtual resources, provisions virtual resources for use in providing cloud-based services, and maintains the physical hardware resources 224, 226 and the virtual resources.

The example hardware layer 302 of FIG. 3 includes the HMS 208 of FIG. 2 that interfaces with the physical hardware resources 224, 226 (e.g., processors, NICs, servers, switches, storage devices, peripherals, power supplies, etc.), the ToR switches 210, 212, 216, 218 of FIG. 2, the spine switches 222 of FIG. 2, and network attached storage (NAS) hardware 308. The HMS 208 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208 also supports rack-level boot-up sequencing of the physical hardware resources 224, 226 and provides services such as secure resets, remote resets, and/or hard resets of the physical hardware resources 224, 226.

The HMS 208 of the illustrated example is part of a dedicated management infrastructure in a corresponding physical rack 202, 204 including the dual-redundant management switches 207, 213 and dedicated management ports attached to the server host nodes(0) 209, 211 and the ToR switches 210, 212, 216, 218. In the illustrated example, one instance of the HMS 208 runs per physical rack 202, 204. For example, the HMS 208 may run on the management switch 207, 213 and the server host node(0) 209, 211 installed in the example physical rack 202 of FIG. 2. In the illustrated example of FIG. 2 both of the HMSs 208 are provided in corresponding management switches 207, 213 and the corresponding server host nodes(0) 209, 211 as a redundancy feature in which one. In some examples, to achieve seamless failover, two instances of an HMS 208 run in a single physical rack 202, 204. In such examples, the physical rack 202, 204 is provided with two management switches, and each of the two management switches runs a separate instance of the HMS 208. In such examples, the physical rack 202 of FIG. 2 runs two instances of the HMS 208 on two separate physical hardware management switches and two separate server host nodes(0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes(0) in the physical rack 202 are connected over a point-to-point, dedicated Ethernet link which carries heartbeats and memory state synchronization between the primary and secondary HMS instances.

The example virtualization layer 304 includes the VRM 225. The example VRM 225 communicates with the HMS 208 to manage the physical hardware resources 224, 226. The example VRM 225 creates the example virtual server rack 206 out of underlying physical hardware resources 224, 226 that may span one or more physical racks (or smaller units such as a hyper-appliance or half rack) and handles physical management of those resources. The example VRM 225 uses the virtual server rack 206 as a basis of aggregation to create and provide operational views, handle fault domains, and scale to accommodate workload profiles. The example VRM 225 keeps track of available capacity in the virtual server rack 206, maintains a view of a logical pool of virtual resources throughout the SDDC life-cycle, and translates logical resource provisioning to allocation of physical hardware resources 224, 226. The example VRM 225 interfaces with an example hypervisor 310 of the virtualization layer 304. The example hypervisor 310 is installed and runs on server hosts in the example physical resources 224, 226 to enable the server hosts to be partitioned into multiple logical servers to create VMs. In some examples, the hypervisor 310 may be implemented using an ESXI hypervisor available as a component of a vSphere virtualization suite developed and provided by VMware, Inc. The vSphere virtualization suite is a collection of components to setup and manage a virtual infrastructure of servers, networks, and other resources In the illustrated example of FIG. 3, the hypervisor 310 is shown having a number of virtualization components executing thereon including an example network virtualizer 312, an example VM migrator 314, an example distributed resource scheduler (DRS) 316, an example storage virtualizer 318, and an example virtual distributed switch (VDS) 320. In the illustrated example, the VRM 225 communicates with these components to manage and present the logical view of underlying resources such as hosts and clusters. The example VRM 225 also uses the logical view for orchestration and provisioning of workloads.

The example network virtualizer 312 virtualizes network resources such as physical hardware switches (e.g., the management switches 207, 213 of FIG. 2, the ToR switches 210, 212, 216, 218, and/or the spine switches 222) to provide software-based virtual networks. The example network virtualizer 312 enables treating physical network resources (e.g., switches) as a pool of transport capacity. In some examples, the network virtualizer 312 also provides network and security services to VMs with a policy driven approach. The network virtualizer 312 includes a number of components to deploy and manage virtualized network resources across servers, switches, and clients. For example, the network virtualizer 312 includes a network virtualization manager that functions as a centralized management component of the network virtualizer 312 and runs as a virtual appliance on a server host. In some examples, the network virtualizer 312 may be implemented using an NSX network virtualization platform that includes a number of components including an NSX network virtualization manager.

The example VM migrator 314 is provided to move or migrate VMs between different hosts without losing state during such migrations. For example, the VM migrator 314 allows moving an entire running VM from one physical server to another with substantially little or no downtime. The migrating VM retains its network identity and connections, which results in a substantially seamless migration process. The example VM migrator 314 enables transferring the VM's active memory and precise execution state over a high-speed network, which allows the VM to switch from running on a source server host to running on a destination server host. In some examples, the network virtualizer 312 and/or the example VM migrator 312 implement the example workload domain controller 120 of FIG. 1.

The example DRS 316 is provided to monitor resource utilization across resource pools, to manage resource allocations to different VMs, to deploy additional storage capacity to VM clusters with substantially little or no service disruptions, and to work with the VM migrator 314 to automatically migrate VMs during maintenance with substantially little or no service disruptions.

The example storage virtualizer 318 is software-defined storage for use in connection with virtualized environments. The example storage virtualizer 318 clusters server-attached hard disk drives (HDDs) and solid state drives (SSDs) to create a shared datastore for use as virtual storage resources in virtual environments. In some examples, the storage virtualizer 318 may be implemented using a VMware VIRTUAL SAN™ network data storage virtualization component developed and provided by VMware, Inc.

Figure 4:
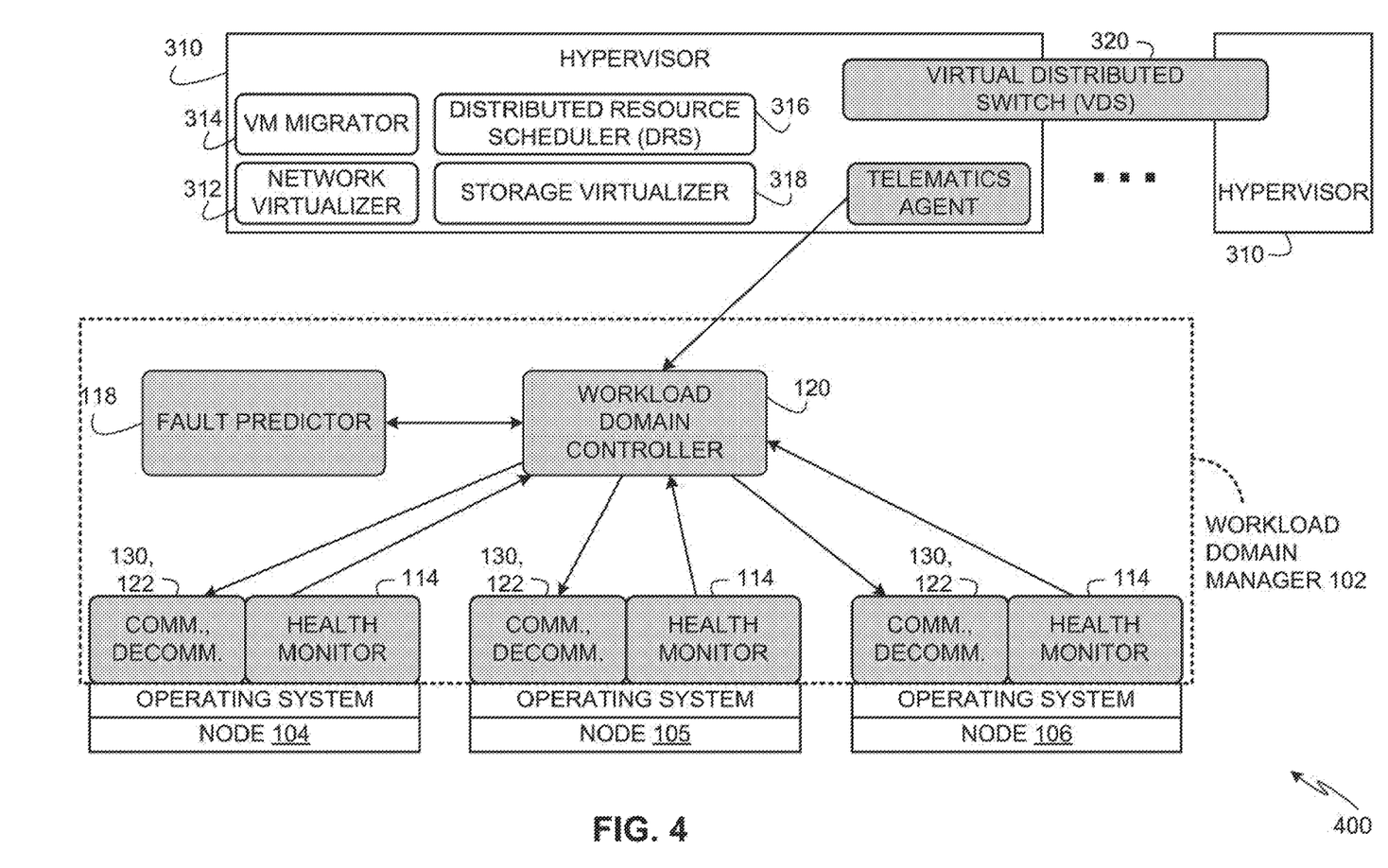
FIG. 4 depicts an example virtual cloud management system that may be used to implement examples disclosed herein.

The example VDS 320 implements software-defined networks for use in connection with virtualized environments in the form of a networking module for the hypervisor 310. In some examples, the VDS 320 is distributed across multiple hosts, where there is a separate instance of the hypervisor 310, as shown in FIG. 4.

The virtualization layer 304 of the illustrated example, and its associated components are configured to run VMs. However, in other examples, the virtualization layer 304 may additionally, and/or alternatively, be configured to run containers. For example, the virtualization layer 304 may be used to deploy a VM as a data computer node with its own guest OS on a host using resources of the host. Additionally, and/or alternatively, the virtualization layer 304 may be used to deploy a container as a data computer node that runs on top of a host OS without the need for a hypervisor or separate OS.

In the illustrated example, the OAM layer 306 is an extension of a VMware VCLOUD® AUTOMATION CENTER™ (VCAC) that relies on the VCAC functionality and also leverages utilities such as VMware VREALIZE™ LOG INSIGHT™, and VMware VCENTER™ HYPERIC® to deliver a single point of SDDC operations and management. The example OAM layer 306 is configured to provide different services such as health monitoring service, capacity planner service, maintenance planner service, events and operational view service, and virtual rack application workloads manager service.

Example components of FIG. 3 may be implemented using products developed and provided by VMware, Inc. Alternatively, some or all of such components may alternatively be supplied by components with the same and/or similar features developed and/or provided by other virtualization component developers.

FIG. 4 depicts an example virtual cloud management system 400 that may be used to implement examples disclosed herein. The example virtual cloud management system 400 includes the example network virtualizer 312, the example VM migrator 314, the example DRS 316, the example storage virtualizer 318, and the example VDS 320 of FIG. 3. In some examples, the example virtual cloud management system 400 is used to implement the example workload domain manager 102 of FIG. 1.

In the illustrated example, the virtual cloud management system 400 is implemented using a SDDC deployment and management platform such as the VMware Cloud Foundation (VCF) platform developed and provided by VMware, Inc. The example virtual cloud management system 400 manages different parameters of the nodes 104, 105, 106.

The example virtual cloud management system 400 includes the example health monitors 114 (e.g., telematics agents), the example fault predictor 118 (e.g., an analytics engine), the example workload domain controller 120 (e.g., a decision engine), and example decommissioners 122 and commissioners 130 (e.g., resource configuration agents). In the illustrated example, the health monitors 114 are provided to collect information from different hardware resources and provide the information to the example workload domain controller 120. In the illustrated example, the health monitors 114 are provided as add-on modules installable and executable on the different components. In the illustrated example, the health monitors 114 run on respective components while creating substantially little or no interference to the OSs of those components. For example, the health monitors 114 may be implemented as a set of access control list (ACL) rules that operate as data collection rules to capture signatures of events that are happening in the virtual cloud management system 400. Such data collection rules can include static rules and/or dynamic rules. The example health monitors 114 collect such information periodically and send the telematics-collected information to the example workload domain controller 120 for analysis by the example fault predictor 118 and to identify subsequent responsive action based on such telematics-collected information.

The example workload domain controller 120 runs on a VM and is provided to make decisions based on analyses of the telematics-collected information received from the health monitors 114. For example, the workload domain controller 120 can program the health monitors 114 based on analyses of the telematics-collected information performed by the fault predictor 118. In some examples, the telematics-collected information is low-level primitive data, and the workload domain controller 120 is configured to identify high-level events based on such low-level primitive data. The example analytics engine 408 runs on a VM and is provided to analyze the telematics-collected information received from the telematics agents 406a-d. For example, the analytics engine 408 can perform big data analyses by periodically accessing the telematics-collected information and analyzing the information, for example, for any system misconfigurations and/or inconsistencies. Some example types of analyses include analyzing information collected using packet sniffers in physical switches to: detect elephant flows and optimize network resources to handle such elephant flows, identify security issues, identify out-of-order delivery of packets, identify network bottlenecks, identify MTU misconfigurations, etc. Another example type of analysis includes analyzing syslog (system log) messages to identify critical system issues.

The example decommissioners 122 and commissioners 130 provide hardware agnostic APIs, which can be accessed by the workload domain controller 120 to change hardware configurations of corresponding hardware resources (e.g., the nodes 104-106). In this manner, the example decommissioners 122 and commissioners 130 can improve operating and/or communication performances and/or efficiencies of workload domains by commissioning and decommissioning nodes to workload domains by configuring hardware resources via the decommissioners 122 and commissioners 130 in response to different events detected based on the analyses of the health data (e.g., telematics-collected information) performed by the fault predictor 118.

Figure 5:
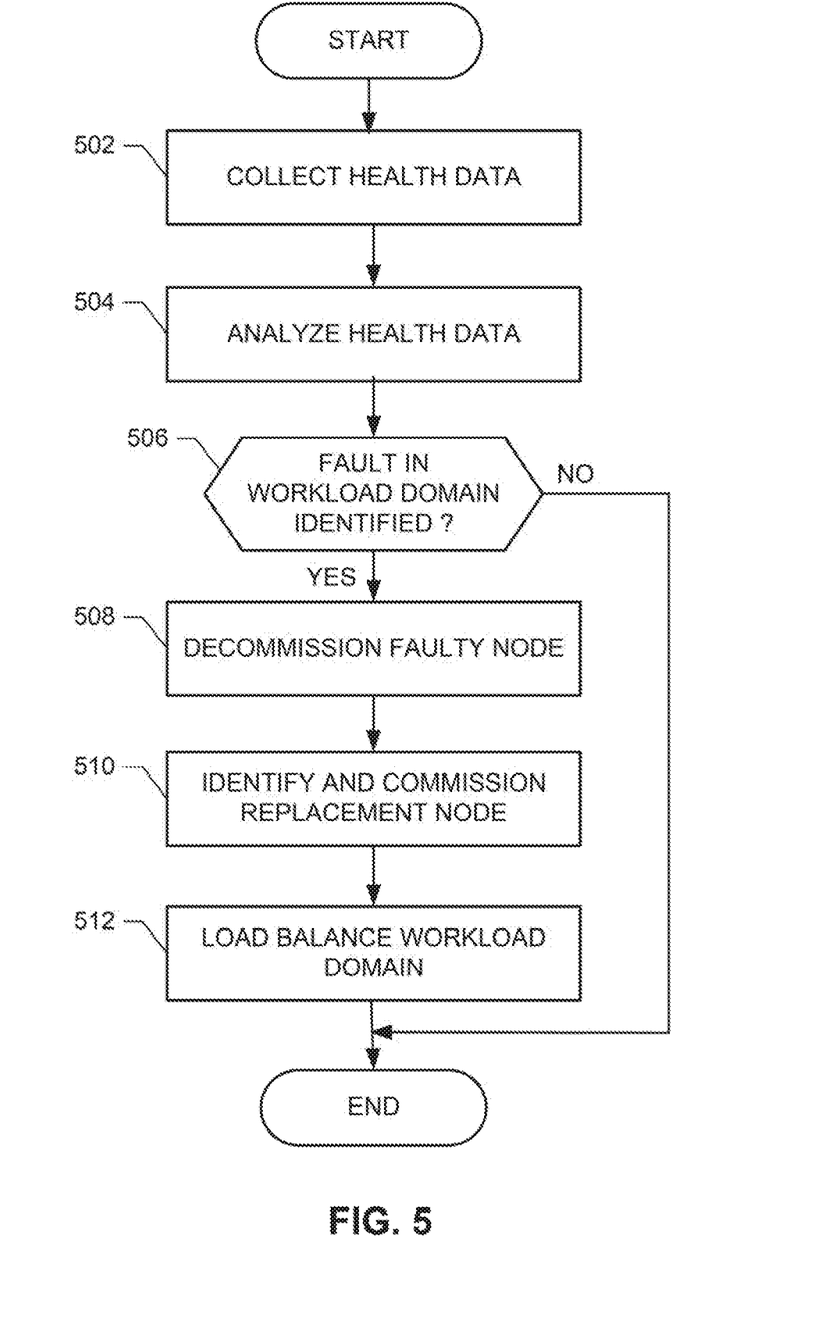
FIG. 5 depicts a flowchart representing example computer-readable instructions that may be executed to implement example workload domain managers disclosed herein to proactively self-heal workload domains.

A flowchart representative of example hardware logic, machine-readable instructions, hardware implemented state machines, and/or any combination thereof for implementing the example workload domain manager 102 of FIG. 1 is shown in FIG. 5. The machine-readable instructions may be an executable program or portion of an executable program for execution by a computer processor such as the processor 610 shown in the example processor platform 600 discussed below in connection with FIG. 6. The program may be embodied in software stored on a non-transitory computer-readable storage medium such as a compact disc read-only memory (CD-ROM), a floppy disk, a hard drive, a DVD, a Blu-ray disk, or a memory associated with the processor 610, but the entire program and/or parts thereof could alternatively be executed by a device other than the processor 610 and/or embodied in firmware or dedicated hardware. Further, although the example program is described with reference to the flowchart illustrated in FIG. 5, many other methods of implementing the example workload domain manager 102 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 5 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The example program of FIG. 5 begins at block 502 where health data is collected (block 502). In some examples, the example health data collector 116 collects, receives, etc. health data from the health monitors 114. The health data is analyzed for the likelihood of potential faults (block 504). In some example, the example fault predictor 118 analyzes the health data using the hidden Markov model disclosed above. If a node that is likelihood to become faulty is identified (block 506), the identified node is decommissioned from the workload domain to which the node belongs (block 508). For example, if the probability that a node is faulty exceeds a threshold, it is identified as faulty. In some examples, the workload domain manager 102 determines whether a node is faulty. In some examples, the decommissioner 122 decommissions the node. A replacement node is identified and commissioned into the workload domain (block 510). For example, a workload domain expansion is performed. In some examples, the commissioner 130 commissions the node. The workload domain is load balanced (block 512). In some examples, the workload domain manager 102 initiates the load balance. Control then exits from the example program of FIG. 5.

Figure 6:
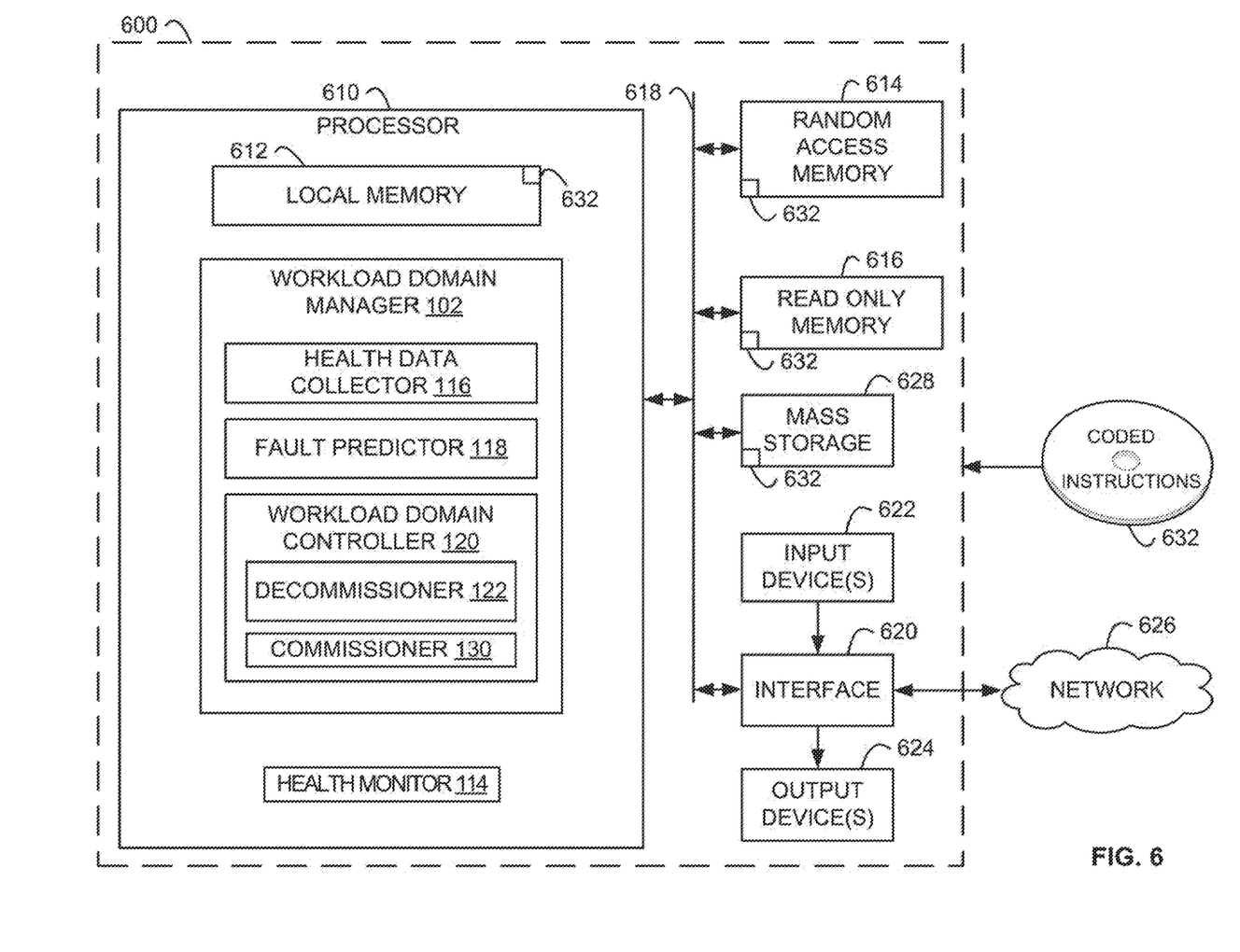
FIG. 6 illustrates an example processor platform structured to execute the example computer-readable instructions of FIG. 5 to implement example workload domain managers disclosed herein.

FIG. 6 is a block diagram of an example processor platform 600 structured to execute the instructions of FIG. 5 to implement the workload domain manager 102 of FIG. 1. The processor platform 600 can be, for example, a server, a personal computer, a workstation, a blade PC, a blade server, or any other type of computing device.

The processor platform 600 of the illustrated example includes a processor 610. The processor 610 of the illustrated example is hardware. For example, the processor 610 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 610 implements the example workload manager 102, the example health monitors 114, the example health data collector 116, the example fault predictor 118, the example workload domain controller 120, the example decommissioner 122, and the example commissioner 130.

The processor 610 of the illustrated example includes a local memory 612 (e.g., a cache). The processor 610 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 610. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 may be locally and/or remotely connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example may also include a communication device such as a transmitter, a receiver, a transceiver, a network interface, a switch, a backplane, etc. to facilitate exchange of data with external machines (e.g., computing devices of any kind) via a network 626.

The processor platform 600 of the illustrated example also includes one or more mass storage devices 628 for storing software and/or data. Examples of such mass storage devices 628 include floppy disk drives, hard drive disks, CD drives, Blu-ray disk drives, redundant array of independent disks (RAID) systems, and DVD drives.

Coded instructions 632 including the coded instructions of FIG. 5 may be stored in the mass storage device 628, in the volatile memory 614, in the non-volatile memory 616, and/or on a removable non-transitory computer-readable storage medium such as a CD-ROM or a DVD.

Examples disclosed herein predict in advance of a fault when a node is likely to cease operating and/or become degraded. Disclosed examples proactively manage the workload domain to which the node belongs by shifting applications off the identified potentially faulty node and decommissioning the identified potentially faulty node from the workload domain, thus, proactively self-healing the workload domain. By self-healing the workload domain remains in a properly operating state, albeit with less processing capability. A replacement/repaired node is commissioned into the workload domain (e.g., a workload domain expansion), and applications in the workload domain are load balanced to take advantage of the restored processing capabilities of the replacement/repaired node. In some examples, the potentially faulty node is automatically decommissioned and the workload domain automatically rebalanced; and the commissioning of the replacement node is manually triggered and/or initiated by an administrator. In some examples, a replacement node is automatically commissioned from a pool of reserved replacement nodes, and the applications automatically load balanced. Examples disclosed herein improve availability of workload domains, increase scalability, and allow for workload domain priorities. For example, a failure in a production workload domain would be addressed before a failure in a test workload domain is addressed.

From the foregoing, it will be appreciated that example methods, apparatus and articles of manufacture have been disclosed that improve the reliability of workload domains by proactively identifying nodes that have or may become faulty and automatically decommissioning the identified potentially faulty node from the workload domain, thus, proactively self-healing the workload domain. From the foregoing, it will be appreciated that methods, apparatus and articles of manufacture have been disclosed that enhance the operations of a computer by reducing the amount of time that the computer may be unavailable. Furthermore, example methods, apparatus, and/or articles of manufacture overcome inaccuracies and inability in the prior art to manage workload domains.

Example methods, apparatus and articles of manufacture to proactively self-heal workload domains in hyperconverged infrastructures are disclosed herein. Further examples and combinations thereof include at least the following.

Example 1 is an apparatus that includes a fault predictor to determine a probability that a node of a workload domain in a hyperconverged infrastructure will likely become faulty, and a decommissioner to decommission the node from the workload domain after the probability indicates the node will likely become faulty.

Example 2 is the apparatus of example 1, wherein the fault predictor is trained using historical health data collected from nodes together with information regarding when actual faults occurred, and the probability is determined by passing current health data through the trained fault predictor.

Example 3 is the apparatus of example 1, wherein the fault predictor is to determine the probability based on monitored health data for the node.

Example 4 is the apparatus of example 1, wherein the decommissioner is to decommission the node when the probability exceeds a threshold.

Example 5 is the apparatus of example 1, wherein the decommissioner does not decommission the node from the workload domain when the probability does not represent the node is likely to become faulty.

Example 6 is the apparatus of example 1, further including a commissioner to commission a replacement node for the workload domain after the node is decommissioned.

Example 7 is the apparatus of example 1, further including a health data collector to collect health data for the node.

Example 8 is the apparatus of example 1, wherein the workload domain includes a plurality of applications executing on a plurality of nodes, the applications having at least one of a substantially similar performance requirement, a substantially similar availability requirement, or a substantially similar security requirement.

Example 9 is a computer-implemented method including identifying, by executing an instruction with one or more processors, whether a node of a workload domain in a hyperconverged infrastructure is likely to develop a fault, and removing, by executing an instruction with the one or more processors, the node from the workload domain after the identifying identifies the node as likely to develop the fault.

Example 10 is the computer-implemented method of example 9, wherein the identifying the likelihood the node will develop the potential fault is based on measured health data for the node.

Example 11 is the computer-implemented method of example 9, wherein the identifying the likelihood the node will develop the potential fault includes training a predictor using historical measured health data collected from nodes together with information regarding when actual faults occurred, and passing measured health data for the node through the predictor to identify the likelihood.

Example 12 is the computer-implemented method of example 9, wherein, by executing an instruction with the one or more processors, the one or more processors do not remove the node from the workload domain when the likelihood the node will develop the potential fault is low.

Example 13 is the computer-implemented method of example 9, further including commissioning, by executing an instruction with the one or more processors, a replacement node for the workload domain after the node is removed.

Example 14 is the computer-implemented method of example 9, further including collecting, by executing an instruction with the one or more processors, measured health data for the node.

Example 15 is the computer-implemented method of example 9, wherein the workload domain includes a plurality of applications executing on a plurality of nodes, the applications having at least one of a similar performance requirement, a similar availability requirement, or a similar security requirement.

Example 16 is a non-transitory computer-readable storage medium comprising instructions that, when executed by one or more processors, cause the one or more processors to perform at least the operations of identifying, by executing an instruction with one or more processors, whether a node of a workload domain in a hyperconverged infrastructure likely has a potential fault, and decommissioning, by executing an instruction with the one or more processors, the node from the workload domain after the identifying identifies that the node likely has the potential fault.

Example 17 is the non-transitory computer-readable storage medium of example 16, wherein the instructions executed by the one or more processors, cause the one or more processors to identify the node likely having the potential fault by training a predictor using historical health data collected from nodes together with information regarding when actual faults occurred, and passing monitored health data for the node through the predictor to identify the node.

Example 18 is the non-transitory computer-readable storage medium of example 16, wherein the instructions executed by the one or more processors, cause the one or more processors to identify the node likely having the potential fault based on monitored health data for the node.

Example 19 is the non-transitory computer-readable storage medium of example 16, wherein the instructions executed by the one or more processors, cause the one or more processors to not decommission the node from the workload domain when the identifying does not identify the node as likely having the potential fault.

Example 20 is the non-transitory computer-readable storage medium of example 16, wherein the instructions executed by the one or more processors, cause the one or more processors to obtain health data for the node.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a fault predictor to:
   train a Markov model using one or more training sequences based on health data collected from a node of a workload domain in a hyperconverged infrastructure;
   execute the Markov model to determine a probability of whether the node will likely become faulty;
   before failure of the node, determine whether the probability satisfies a threshold to indicate whether the node will likely become faulty; and
   identify the node to be decommissioned in response to the probability satisfying the threshold; and
a controller to decommission the node from the workload domain after the probability indicates the node will likely become faulty.

2. The apparatus of claim 1, wherein the fault predictor is to train the Markov model using the health data collected from a plurality of nodes together with information regarding when actual faults occurred, and the fault predictor is to determine the probability based on passing current health data of the node through the Markov model, the plurality of the nodes including the node.

3. The apparatus of claim 1, wherein the fault predictor is to determine the probability based on monitored health data for the node.

4. The apparatus of claim 1, wherein the controller does not decommission the node in response to the fault predictor determining that the probability does not satisfy the threshold.

5. The apparatus of claim 1, wherein the controller is to commission a replacement node for the workload domain after the node is decommissioned.

6. The apparatus of claim 1, further including a health data collector to collect the health data for the node.

7. The apparatus of claim 1, wherein the workload domain includes a plurality of applications executing on a plurality of nodes, the applications having at least one of a substantially similar performance requirement, a substantially similar availability requirement, or a substantially similar security requirement.

8. A computer-implemented method, comprising:
training, by executing an instruction with one or more processors, a Markov model using one or more training sequences based on health data obtained from a node of a workload domain in a hyperconverged infrastructure;
executing, by executing an instruction with the one or more processors, the Markov model to determine a probability of whether the node is likely to develop a fault;
before failure of the node, determining, by executing an instruction with the one or more processors, whether the probability satisfies a threshold to indicate whether the node is likely to develop the fault;
identifying, by executing an instruction with the one or more processors, the node to be decommissioned in response to the probability satisfying the threshold; and
removing, by executing an instruction with the one or more processors, the node from the workload domain after identifying the node as likely to develop the fault.

9. The computer-implemented method of claim 8, wherein the determining of whether the probability indicates the node is likely to develop the fault is based on measured health data for the node.

10. The computer-implemented method of claim 8, wherein the health data is historical measured health data, and the identifying the probability the node will develop the fault includes:
- training the Markov model using the historical measured health data collected from nodes together with information regarding when actual faults occurred; and
- passing measured health data for the node through the Markov model to determine the probability.

11. The computer-implemented method, of claim 8, further including not removing the node from the workload domain in response to determining that the probability does not satisfy the threshold to indicate that the node is unlikely to develop the fault.

12. The computer-implemented method of claim 8, further including commissioning, by executing an instruction with the one or more processors, a replacement node for the workload domain after the node is removed.

13. The computer-implemented method of claim 8, further including collecting, by executing an instruction with the one or more processors, measured health data for the node.

14. The computer-implemented method of claim 8, wherein the workload domain includes a plurality of applications executing on a plurality of nodes, the applications having at least one of a similar performance requirement, a similar availability requirement, or a similar security requirement.

15. A non-transitory computer-readable storage medium comprising instructions that, when executed, cause one or more processors to at least:
- train a Markov model using one or more training sequences based on health data obtained from a node of a workload domain in a hyperconverged infrastructure;
- execute the Markov model to determine a probability of whether the node will likely become faulty;
- before failure of the node, determine whether the probability satisfies a threshold to indicate whether the node will likely have a potential fault;
- identify the node to be decommissioned in response to the probability satisfying the threshold; and
- decommission the node from the workload domain after the identifying that the node will likely have the potential fault.

16. The non-transitory computer-readable storage medium of claim 15, wherein the instructions, when executed, cause the one or more processors to identify the node likely having the potential fault by:
- training the Markov model using historical health data collected from nodes together with information regarding when actual faults occurred; and
- passing monitored health data for the node through the Markov model to identify the node.

17. The non-transitory computer-readable storage medium of claim 15, wherein the instructions, when executed, cause the one or more processors to identify the node likely having the potential fault based on monitored health data for the node.

18. The non-transitory computer-readable storage medium of claim 15, wherein the instructions, when executed, cause the one or more processors to not decommission the node from the workload domain when the identifying does not identify the node to be decommissioned in response to the probability not satisfying the threshold.

19. The non-transitory computer-readable storage medium of claim 15, wherein the instructions, when executed, cause the one or more processors to obtain monitored health data for the node.

20. The non-transitory computer-readable storage medium of claim 15, wherein the Markov model is a hidden Markov model.

21. A non-transitory computer-readable storage medium comprising instructions that, when executed, cause one or more processors to at least:
- collect a portion of historical health data from a first node of a workload domain in a hyperconverged infrastructure, the collection in response to a trigger by the first node of one or more access control list rules, the portion of the historical health data including signatures of events associated with the first node, the signatures to be captured based on the one or more access control list rules, the events including at least one of an elephant flow, a security issue, an out-of-order delivery of packets, or a network bottleneck;
- before failure of a second node of the workload domain, determine a probability that the second node will likely become faulty; and
- decommission the second node from the workload domain after the probability indicates the node will likely become faulty.

22. The non-transitory computer-readable storage medium of claim 21, wherein the instructions, when executed, cause the one or more processors to:
- train a model using one or more training sequences based on the portion of the historical health data;
- determine the probability based on the model; and
- identify the second node to be decommissioned in response to the probability satisfying a threshold.

23. An apparatus comprising:
- a health data collector to collect a portion of historical health data from a first node of a workload domain in a hyperconverged infrastructure, the collection in response to a trigger by the first node of one or more access control list rules, the portion of the historical health data including signatures of events associated with the first node, the signatures to be captured based on the one or more access control list rules, the events including at least one of an elephant flow, a security issue, an out-of-order delivery of packets, or a network bottleneck;
- a fault predictor to, before failure of a second node of the workload domain, determine a probability that the second node will likely become faulty; and
- a controller to decommission the second node from the workload domain after the probability indicates the node will likely become faulty.

24. The apparatus of claim 23, wherein the fault predictor is to:
- train a model using one or more training sequences based on the portion of the historical health data;
- determine the probability based on the model; and
- identify the second node to be decommissioned in response to the probability satisfying a threshold.

25. A computer-implemented method comprising:
- collecting, by executing an instruction with one or more processors, a portion of historical health data from a first node of a workload domain in a hyperconverged infrastructure, the collection in response to a trigger by the first node of one or more access control list rules, the portion of the historical health data including signatures of events associated with the first node, the signatures to be captured based on the one or more access control list rules, the events including at least one of an elephant flow, a security issue, an out-of-order delivery of packets, or a network bottleneck;

before failure of a second node of the workload domain, determining, by executing an instruction with the one or more processors, a probability that the second node will likely become faulty; and decommissioning, by executing an instruction with the one or more processors, the second node from the workload domain after the probability indicates the node will likely become faulty.

26. The computer-implemented method of claim 25, further including:

training a model using one or more training sequences based on the portion of the historical health data;

determining the probability based on the model; and identifying the second node to be decommissioned in response to the probability satisfying a threshold.

* * * * *